US012748373B2

(12) United States Patent
Sato

(10) Patent No.: US 12,748,373 B2
(45) Date of Patent: Sep. 29, 2026

(54) IMAGE FORMING APPARATUS INCLUDING DEVELOPING DEVICE SUPPORTING STRUCTURE HAVING GUIDE GROOVE

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/052,454

(22) Filed: Feb. 13, 2025

(65) Prior Publication Data

US 2025/0181024 A1 Jun. 5, 2025

Related U.S. Application Data

(63) Continuation of application No. 18/309,075, filed on Apr. 28, 2023, now Pat. No. 12,235,605, which is a continuation of application No. 17/574,927, filed on Jan. 13, 2022, now Pat. No. 11,640,135, which is a continuation of application No. 17/238,337, filed on Apr. 23, 2021, now Pat. No. 11,237,515, which is a continuation of application No. 16/876,241, filed on May 18, 2020, now Pat. No. 10,996,618, which is a (Continued)

(30) Foreign Application Priority Data

Jan. 31, 2014 (JP) ................................ 2014-017519

(51) Int. Cl.
*G03G 21/16* (2006.01)

(52) U.S. Cl.
CPC ..... *G03G 21/1647* (2013.01); *G03G 21/1623* (2013.01); *G03G 21/1633* (2013.01); *G03G 21/1661* (2013.01); *G03G 21/1676* (2013.01); *G03G 2215/0132* (2013.01); *G03G 2221/1684* (2013.01)

(58) Field of Classification Search
CPC ........... G03G 21/1623; G03G 21/1633; G03G 21/1647; G03G 21/1661; G03G 21/1676; G03G 2215/0132; G03G 2221/1684
See application file for complete search history.

(56) References Cited

U.S. PATENT DOCUMENTS 8,467,703 B2 * 6/2013 Nishimura ......... G03G 21/1623 399/119
2009/0317133 A1 * 12/2009 Nishimura ......... G03G 21/1647 399/119

(Continued)

*Primary Examiner* — Sophia S Chen
(74) *Attorney, Agent, or Firm* — Merchant & Gould P.C.

(57) ABSTRACT

There is provided an image forming apparatus including a main casing, an opening-closing member configured to open and close an opening on a side of the main casing and to move between an open position and a closed position, a belt unit configured to move between a first position and a second position, a drum unit configured to move between a third position and a fourth position, a developing device unit configured to move in an arrangement direction of developing rollers, and an interlock mechanism configured such that in response to a movement of the opening-closing member from the closed position to the open position, the belt unit moves from the first position to the second position and the drum unit moves from the third position to the fourth position.

15 Claims, 10 Drawing Sheets

Related U.S. Application Data continuation of application No. 16/401,773, filed on May 2, 2019, now Pat. No. 10,671,014, which is a continuation of application No. 15/897,937, filed on Feb. 15, 2018, now Pat. No. 10,281,870, which is a continuation of application No. 15/397,474, filed on Jan. 3, 2017, now Pat. No. 9,897,969, which is a continuation of application No. 15/068,181, filed on Mar. 11, 2016, now Pat. No. 9,541,893, which is a continuation of application No. 14/610,800, filed on Jan. 30, 2015, now Pat. No. 9,285,759.

(56) References Cited

U.S. PATENT DOCUMENTS

| | | | | |
|---|---|---|---|---|
| 2009/0324283 | A1* | 12/2009 | Mushika ............ | G03G 21/1676<br>399/119 |
| 2011/0305479 | A1* | 12/2011 | Nishiuwatoko .... | G03G 21/1633<br>399/119 |

* cited by examiner

IMAGE FORMING APPARATUS INCLUDING DEVELOPING DEVICE SUPPORTING STRUCTURE HAVING GUIDE GROOVE

CROSS-REFERENCE TO RELATED APPLICATION

This application is a continuation of U.S. patent application Ser. No. 18/309,075, filed Apr. 28, 2023, now U.S. Pat. No. 12,235,605, which is a continuation of U.S. patent application Ser. No. 17/574,927, filed Jan. 13, 2022, now U.S. Pat. No. 11,640,135, which is a continuation of U.S. patent application Ser. No. 17/238,337, filed Apr. 23, 2021, now U.S. Pat. No. 11,237,515, which is a continuation of U.S. patent application Ser. No. 16/876,241, filed May 18, 2020, now U.S. Pat. No. 10,996,618, which is a continuation of U.S. patent application Ser. No. 16/401,773, filed May 2, 2019, now U.S. Pat. No. 10,671,014, which is a continuation of U.S. patent application Ser. No. 15/897,937, filed Feb. 15, 2018, now U.S. Pat. No. 10,281,870, which is a continuation of U.S. patent application Ser. No. 15/397,474, filed Jan. 3, 2017, now U.S. Pat. No. 9,897,969, which is a continuation of U.S. patent application Ser. No. 15/068,181, filed Mar. 11, 2016, now U.S. Pat. No. 9,541,893, which is a continuation of U.S. patent application Ser. No. 14/610,800, filed Jan. 30, 2015, now U.S. Pat. No. 9,285,759, all of which further claims priority from Japanese Patent No. 2014-017519, filed on Jan. 31, 2014, the contents of all of which are incorporated herein by reference.

TECHNICAL FIELD

Aspects of the present invention relate to an image forming apparatus including a belt unit, a drum unit, and a developing device unit.

BACKGROUND

A known image forming apparatus includes a developing device unit, and a belt unit and a drum unit that are disposed above the developing device unit. To prevent the developing device unit from interfering with the drum unit when the developing device unit is drawn, the image forming apparatus is configured to move the drum unit upward and downward in response to the opening and closing movements of an upper cover of the image forming apparatus. After the upper cover is opened to retract the drum unit upward, a front cover of the image forming apparatus is opened to withdraw the developing device unit.

SUMMARY

In the structure of the known image forming apparatus, the upper cover and the front cover need to be opened to withdraw the developing device unit, which is troublesome.

One or more aspects of the disclosure are to provide an image forming apparatus in which a developing device unit may be readily withdrawn.

According to one or more aspects of the disclosure, an image forming apparatus may include a main casing, an opening-closing member, a belt unit, a drum unit, a developing device unit, and an interlock mechanism. The main casing may have an opening on a side thereof. The opening-closing member may be configured to open and close the opening on the side of the main casing, to be pivotable relative to the main casing, and to move between an open position in which the opening is opened and a closed position in which the opening is closed. The belt unit may include an endless belt, may be disposed in the main casing and may be configured to move between a first position and a second position positioned above the first position. The drum unit may include a plurality of photosensitive drums, may be disposed below the belt unit and may be configured to move between a third position and a fourth position positioned above the third position. The developing device unit may be disposed below the belt unit, may include a plurality of developing rollers each of which corresponds to a respective one of the plurality of photosensitive drums, and may be configured to move, through the opening, in an arrangement direction in which the plurality of developing rollers is arranged. The interlock mechanism may be configured such that in response to a movement of the opening-closing member from the closed position to the open position, the belt unit moves from the first position to the second position and the drum unit moves from the third position to the fourth position, and in response to a movement of the opening-closing member from the open position to the closed position, the belt unit moves from the second position to the first position and the drum unit moves from the fourth position to the third position.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

An illustrative embodiment will be described with reference to the accompanying drawings. First, overall structures of an image forming apparatus, e.g., a color multifunction device 1, and then features of the disclosure will be described.

Figure 1:
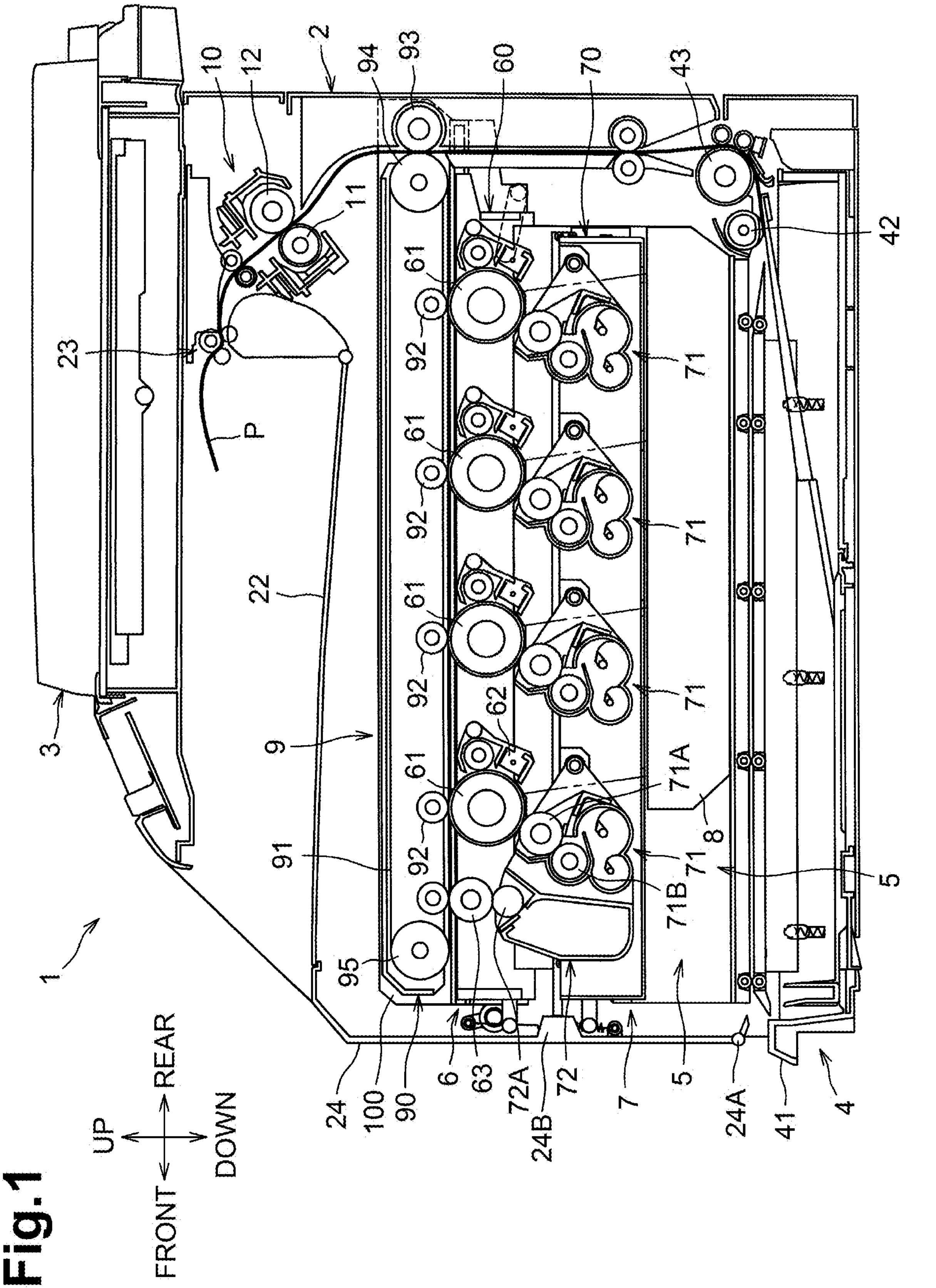
FIG. 1 is a sectional view of a color multifunction device in an illustrative embodiment according to one or more aspects of the disclosure.

Hereinafter, description will be made with reference to directions that are defined in conjunction with an orientation in which a user uses the color multifunction device 1. More specifically, left and right sides of FIG. 1 are defined as front/forward and rear/back sides, respectively. The front and back sides of the sheet of FIG. 1 are defined as right and left sides, respectively. The top-bottom direction in FIG. 1 is defined as the vertical direction.

General Structure of Color Multifunction Device

As depicted in FIG. 1, the color multifunction device 1 mainly includes a main casing 2, and a flatbed scanner 3 disposed above the main casing 2. The color multifunction device 1 mainly includes, in the main casing 2, a sheet supply unit 4 configured to supply a recording sheet, e.g., a sheet P, and an image forming unit 5 configured to form an image on the supplied sheet P.

Figure 3:
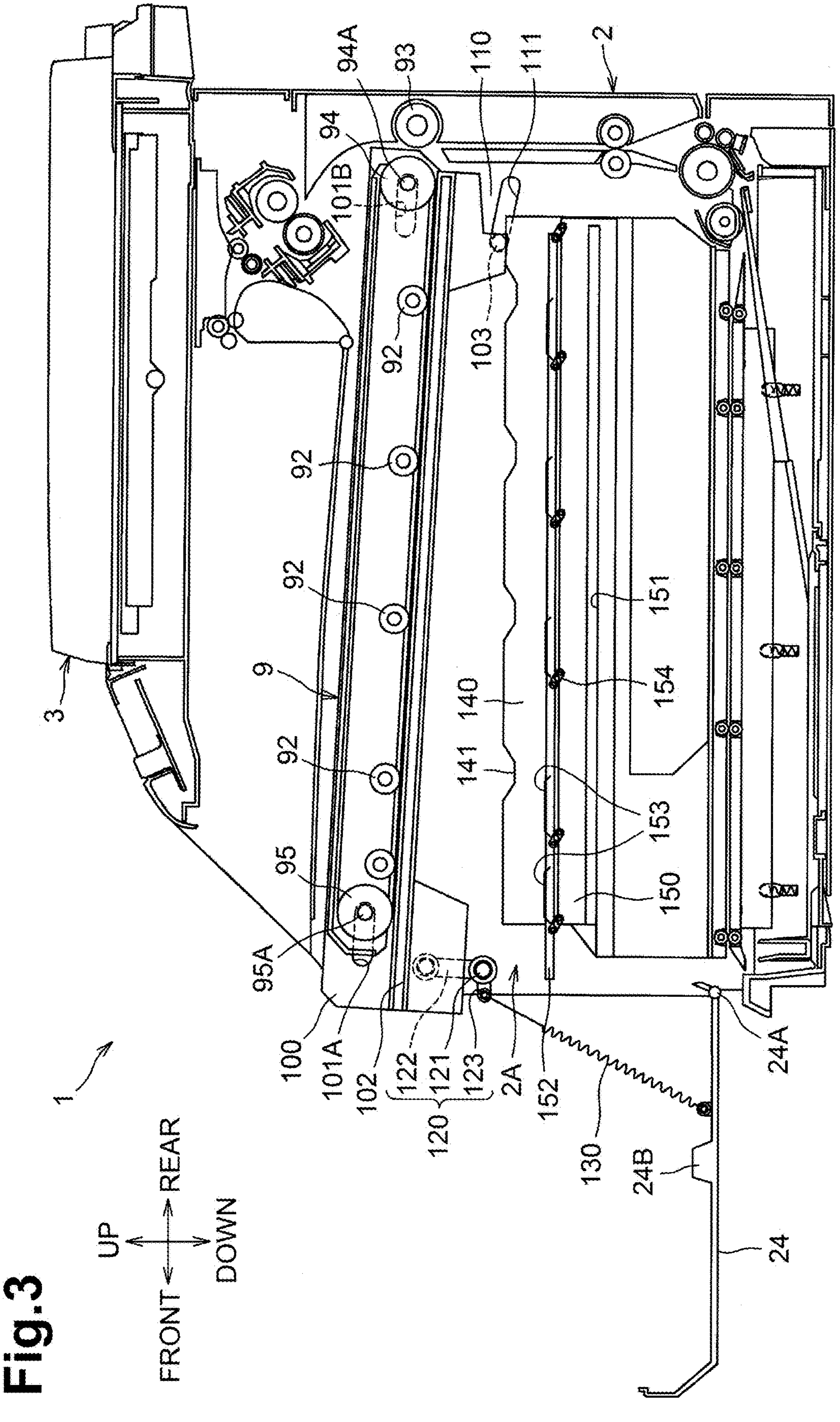
FIG. 3 is a sectional view of the color multifunction device with the front cover open, depicting the developing device unit and the drum unit are removed from the color multifunction device.

The main casing 2 has an opening 2A at a front portion thereof (refer to FIG. 3). The main casing 2 includes an opening-closing member, e.g., a front cover 24, configured to cover a front portion of the opening 2A. The front cover 24 is configured to pivot on a pivot shaft 24A disposed at a lower portion of the front cover 24, so that the opening 2A may be opened or closed. In other words, the front cover 24 is configured to move between an open position (e.g., a position as depicted in FIG. 3) in which the front cover 24 opens or uncovers the opening 2A and a closed position (e.g., a position as depicted in FIG. 1) in which the front cover 24 covers or closes the opening 2A. The pivot shaft 24A is disposed below a developing device unit 7 (described below).

The flatbed scanner 3 is a document reading device having a known structure. The flatbed scanner 3 is configured to irradiate a document with light to read an image and generate image data for duplication. The flatbed scanner 3 is disposed with a space between the scanner 3 and a discharge tray 22.

The sheet supply unit 4 mainly includes a sheet cassette 41 disposed at a lower portion of the main casing 2 and configured to be removably attached to the main casing 2, a pickup roller 42 and a separation roller 43 disposed above a rear portion of the sheet cassette 41. The sheets P in the sheet cassette 41 are fed by the pickup roller 42, and separated one by one by the separation roller 43. Then, the sheet P is supplied to the image forming unit 5 (e.g., between an intermediate transfer belt 91 and a second transfer roller 93).

The image forming unit 5 mainly includes a drum unit 6, a developing device unit 7, a scanner unit 8, a belt unit 9, and a fixing unit 10.

The drum unit 6 is disposed below the belt unit 9. The drum unit 6 mainly include, in a supporting member, e.g., a drum supporting frame 60, that constitutes an outer frame of the unit 6, a plurality of, e.g., four, photosensitive drums 61 arranged along the front-rear direction, chargers 62, each corresponding to a respective one of the photosensitive drums 61, and a first cleaning roller 63 disposed in front of the frontmost photosensitive drum 61 among the photosensitive drums 61.

The first cleaning roller 63 is configured to remove toner remaining on the intermediate transfer belt 91 (described below).

The developing device unit 7 is disposed below the drum unit 6. The developing device unit 7 mainly includes, in a developing device supporting frame 70 that constitutes an outer frame of the unit 7, a plurality of, e.g., four, developing devices 71, each corresponding to a respective one of the photosensitive drums 61.

Each of the developing devices 71 mainly includes a developing roller 71A opposing the corresponding photosensitive drum 61, a supply roller 71B configured to supply toner to the developing roller 71A, a toner chamber (reference numeral omitted) that accommodates toner, and an agitator (reference numeral omitted) disposed in the toner chamber. In each of the developing devices 71, toner in the toner chamber is supplied to the supply roller 71B by the agitator that is rotating. Further, the toner is supplied from the supply roller 71B to the developing roller 71A and carried on the developing roller 71A.

A toner storage portion 72 is disposed in front of the frontmost developing device 71 among the developing devices 71. The toner storage portion 72 is disposed at a position corresponding to the first cleaning roller 63. The toner storage portion 72 is configured to store the toner removed by the first cleaning roller 63. More specifically, the toner storage portion 72 includes a second cleaning roller 72A contacting the first cleaning roller 63. The toner storage portion 72 is configured to store the toner scraped off the first cleaning roller 63 by the second cleaning roller 72A.

The scanner unit 8 is disposed at a lower portion of the main casing 2. The scanner unit 8 includes a laser emitting section, a polygon mirror, a lens, and a reflecting mirror, all of which are not depicted in the drawings. In the scanner unit 8, the laser beams travel along paths shown by the two-dot chain lines in FIG. 1 and scan at high speed across respective surfaces of the photosensitive drums 61.

The belt unit 9 mainly includes, in a belt supporting frame 90 that constitutes an outer frame of the unit 9, an intermediate transfer belt 91, four first transfer rollers 92, a second transfer roller 93, a drive roller 94, and a follower roller 95.

The intermediate transfer belt 91 is an endless belt. The intermediate transfer belt 91 is wound around the drive roller 94 and the follower roller 95 that are spaced apart in the front-rear direction and disposed parallel to each other. The photosensitive drums 61 and the first cleaning rollers 63 oppose and contact a lower portion of an outer peripheral surface of the intermediate transfer belt 91. The second transfer roller 93 opposes and contacts a rear portion of the outer peripheral surface of the intermediate transfer belt 91, e.g., a rear end portion of the belt unit 9.

Each of the first transfer rollers 92 contacts an inner peripheral surface of the intermediate transfer belt 91. Each of the first transfer rollers 92 opposes the respective photosensitive drum 61 to hold the intermediate transfer belt 91 therebetween. The second transfer roller 93 opposes the drive roller 94 to hold the intermediate transfer belt 91 therebetween. A transfer bias is applied to the first transfer rollers 92 and the second transfer roller 93 during a transfer operation.

The fixing unit 10 is disposed opposite to the developing device unit 7 relative to the drum unit 6, e.g., above the drum unit 6, at a position closer to a rear end portion of the drum unit 6.

The fixing unit 10 mainly includes a heat roller 11 having a known structure and a pressure roller 12 disposed opposite to the heat roller 11 to press the heat roller 11.

In the image forming unit 5 as structured above, each of the chargers 62 uniformly charges a surface of the respective photosensitive drum 61. Thereafter, the scanner unit 8 exposes the surfaces of the respective photosensitive drums 61 to light, so that the potential of the exposed portions is lowered. Electrostatic latent images are formed based on image data on the surfaces of the respective photosensitive drums 61.

Then, toner carried on each of the developing rollers 71A is supplied to electrostatic latent images formed on the respective photosensitive drums 61. Thus, the toner is selectively carried on the photosensitive drums 61 and the electrostatic latent images are developed into visible toner images.

The toner images formed on the respective photosensitive drums 61 are sequentially transferred to the intermediate transfer belt 91 so as to be superimposed one on another by virtue of the transfer bias applied to the respective first transfer rollers 92. When the sheet P supplied to the image forming unit 5 passes between the intermediate transfer belt 91 and the second transfer roller 93 to which transfer bias is applied, the full-color toner images on the intermediate transfer belt 91 are transferred on the sheet P.

The sheet P having the toner images transferred thereon is fed to the fixing unit 10. The toner images are thermally fixed onto the sheet P while the sheet P passes between the heat roller 11 and the pressure roller 12. The sheet P having the toner image thermally fixed thereon is discharged by discharge rollers 23 onto the discharge tray 22 outside the main casing 2. The discharge tray 22 is disposed at the upper surface of the main casing 2, so as not to correspond or respond to the opening and closing movements of the front cover 24.

Next, structures of the belt unit 9, the drum unit 6 and the developing device unit 7 will be described.

Structure of Belt Unit

Figure 2:
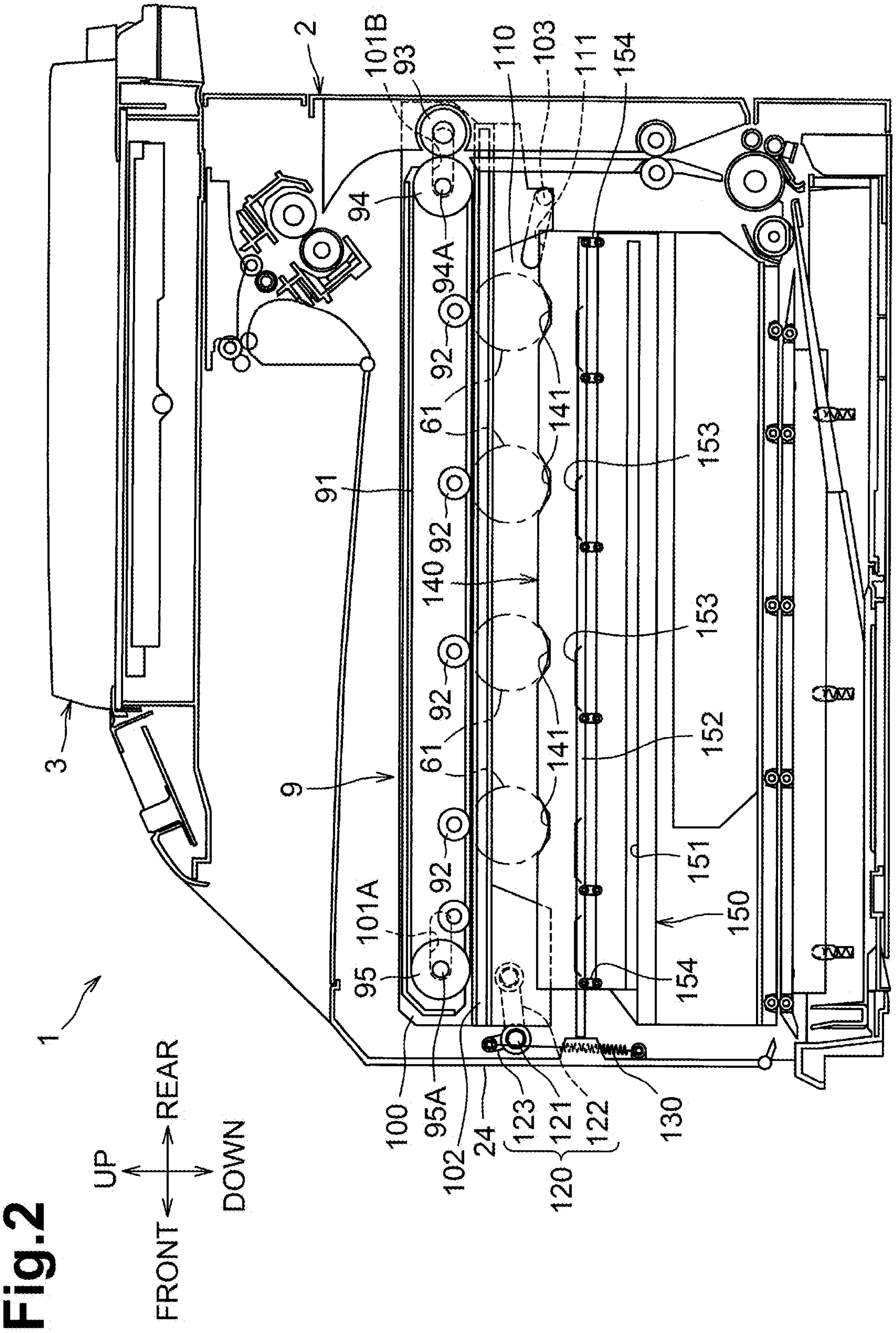
FIG. 2 is a sectional view of the color multifunction device with a front cover closed, depicting a developing device unit and a drum unit are removed from the color multifunction device.

As depicted in FIG. 2, the belt unit 9 is supported by movable members 100 disposed opposite to each other at the right and left sides of the intermediate transfer belt 91.

Each of the movable members 100 extends in the front-rear direction. Each of the movable members 100 is disposed at a respective one of right and left side frames 110 of the main casing 2.

Each of the movable members 100 includes a front opening 101A disposed at a position corresponding to a rotation shaft 95A of the follower roller 95 of the belt unit 9 and a rear opening 101B disposed at a position corresponding to a rotation shaft 94A of the drive roller 94.

The front opening 101A is formed into an elongated hole extending in the front-rear direction. The front opening 101A movably supports the rotation shaft 95A of the follower roller 95. The rear opening 101B is formed into an elongated hole extending in the front-rear direction. The rear opening 101B movably supports the rotation shaft 94A of the drive roller 94.

The movable members 100 are disposed such that a front end portion of the front opening 101A contacts the rotation shaft 95A of the follower roller 95 and a front end portion of the rear opening 101B contacts the rotation shaft 94A of the drive roller 94 when the front cover 24 is closed.

Each of the movable members 100 includes a guide portion 102 disposed below the front opening 101A and the rear opening 101B. The guide portion 102 is a groove extending in the front-rear direction. A front portion of the guide portion 102 is open.

Each of the movable members 100 includes a shaft portion 103 extending outward (e.g., toward an exterior of the main casing 2) in the left-right direction below a rear portion of the respective guide portion 102. The shaft portion 103 is supported by an elongated hole 111 formed on a respective one of side frames 110 disposed at right and left sides of the main casing 2. Thus, each of the movable members 100 is configured to pivotally move about the respective shaft portion 103 relative to the corresponding side frame 110.

The elongated hole 111 diagonally extends forwardly and upwardly. The elongated hole 111 movably supports a respective one of the shaft portions 103. The elongated hole 111 is disposed such that a rear end portion thereof contacts the respective shaft portion 103 when the front cover 24 is closed. Thus, the rearward movements of the movable members 100 are regulated, and the movable members 100 are positioned in place in the main casing 2.

The movable members 100 are coupled to the front cover 24 by respective pivotal members 120 and tension springs 130. The pivotal lever is an example of a pivotal member 120. The tension spring 130 is an example of a connection member and an example of a spring. The pivotal member 120 and the tension spring 130 are an example of a coupling mechanism. The coupling mechanism is an example of an interlock mechanism.

The pivotal member 120 is configured to pivotally move relative to the main casing 2 about an axis of a pivot shaft 121 supported by the main casing 2. The pivotal member 120 includes a first coupling portion 122 extending generally rearward from the pivot shaft 121 when the front cover 24 is closed and a second coupling portion 123 extending generally upward from the pivot shaft 121 when the front cover 24 is closed.

An end of the first coupling portion 122 is pivotally supported below a front portion of the respective movable member 100. One end (e.g., the upper end) of the tension spring 130 is fixed to an end of the second coupling portion 123.

The tension spring 130 is configured to expand and contract. The other end (e.g., the lower end) of the tension spring 130 is fixed to the front cover 24. Thus, each of the tension springs 130 connects the respective second coupling portion 123 and the front cover 24. As the front cover 24 is opened as depicted in FIG. 3, each of the tension springs 130 pulls the respective second coupling portion 123 downward to pivotally move the respective pivotal member 120 counterclockwise in FIG. 2.

Structure of Drum Unit

Figure 4:
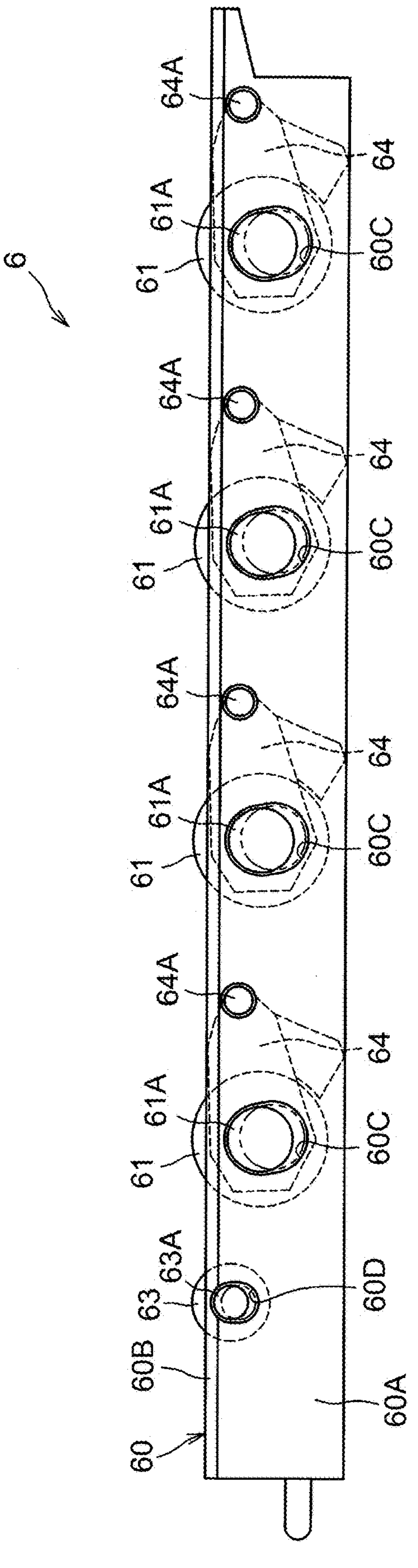
FIG. 4 is a side view of the drum unit.
Figure 5:
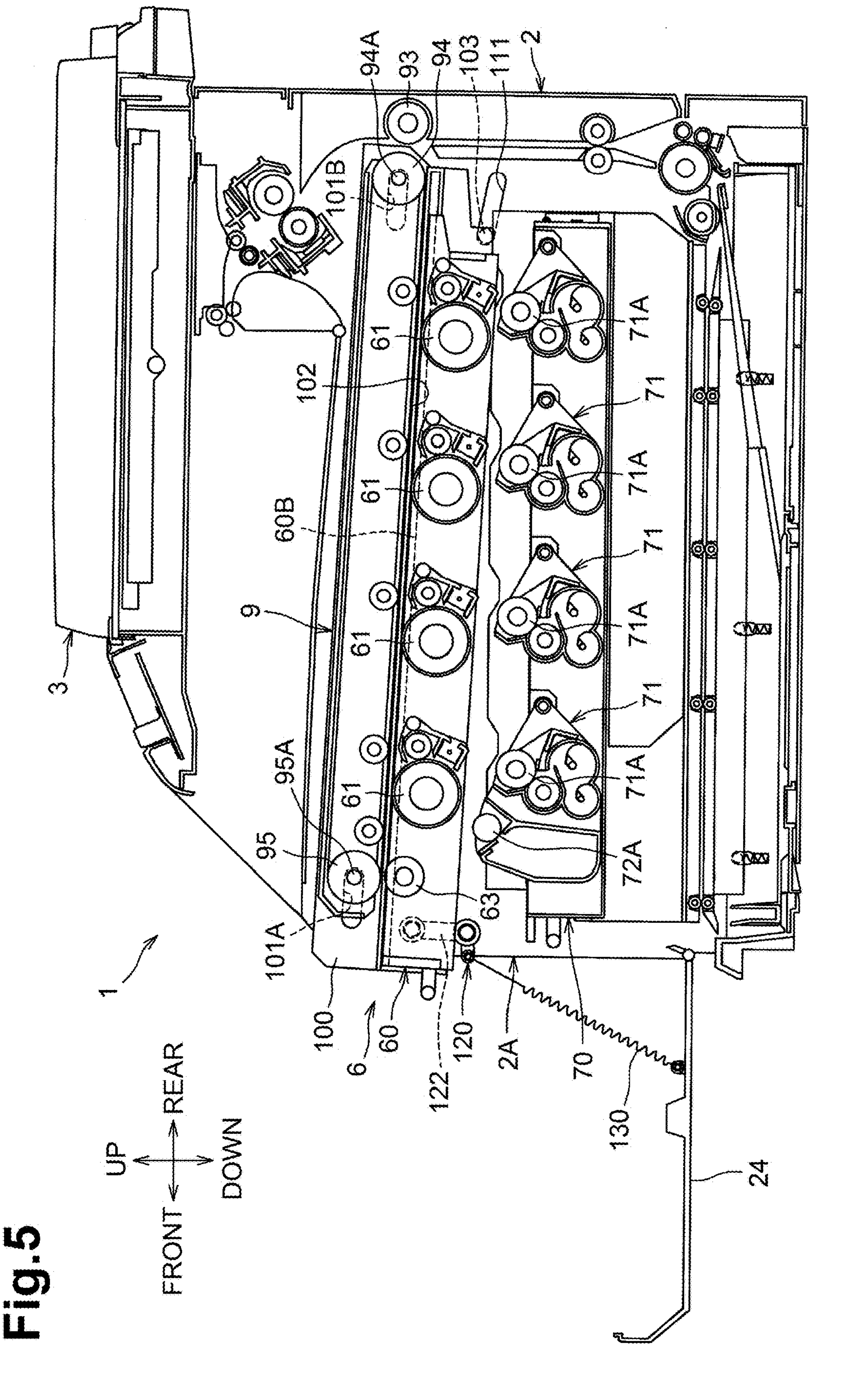
FIG. 5 is a sectional view of the color multifunction device with the front cover open.
Figure 6:
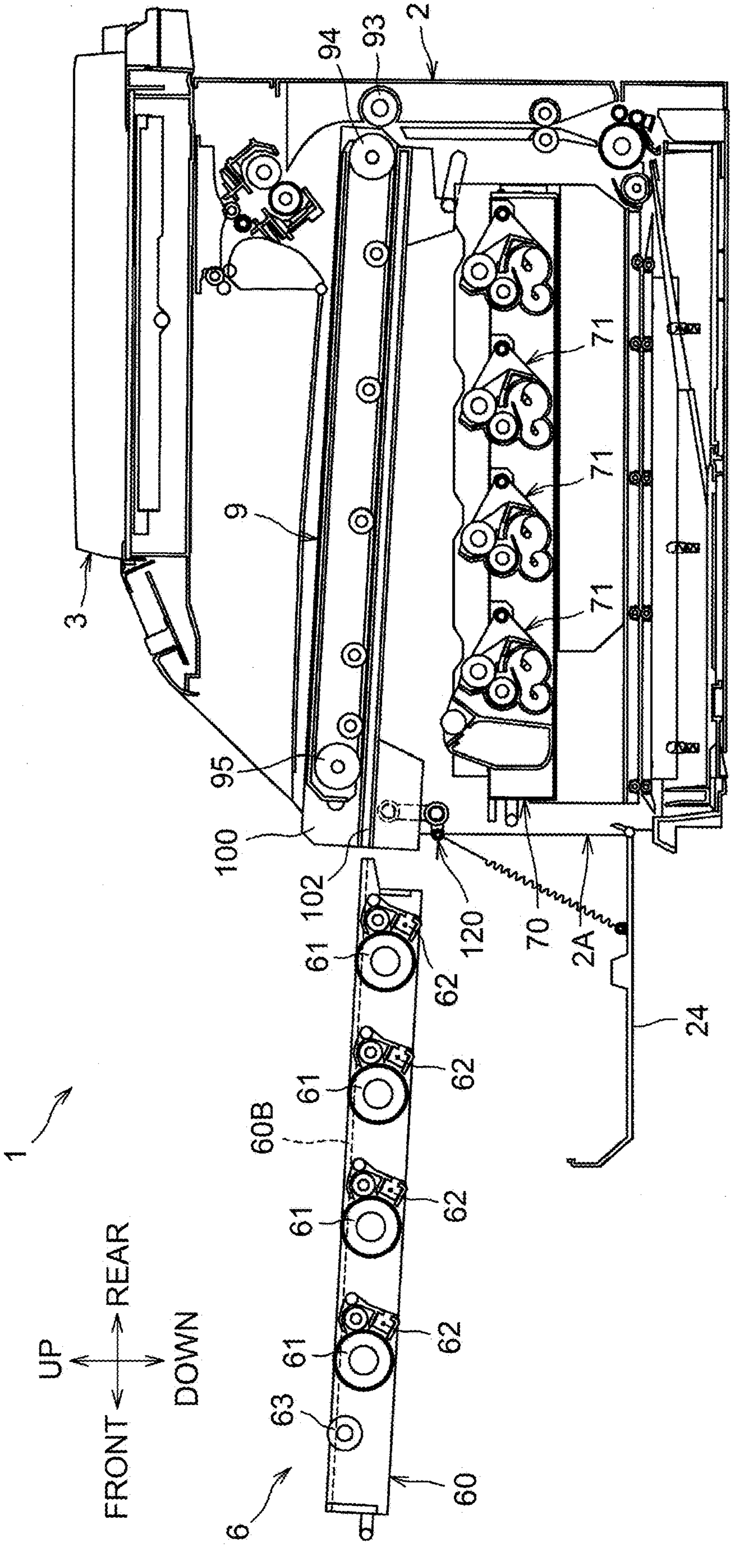
FIG. 6 is a sectional view of the color multifunction device from which the drum unit is withdrawn.

As depicted in FIG. 4, the drum unit 6 includes a drum supporting frame 60 having a frame shape in plane view. The upper end of each of side walls 60A of the drum supporting frame 60 is provided with a drum rib 60B extending outward (e.g., toward an exterior of the main casing 2) in the left-right direction. The drum rib 60B is a portion supported by the respective movable member 100. The guide portion 102 of each of the movable members 100 allows the respective the drum rib 60B to enter thereinto. The drum unit 6 is configured to be withdrawn through the opening 2A in a direction in which the photosensitive drums 61 are arranged, while the movement of the drum unit 6 is guided by the guide portions 102, as depicted in FIGS. 5 and 6.

As depicted in FIG. 4, each of the photosensitive drums 61 is provided in a drum frame 64 pivotally supported by the drum supporting frame 60. A shaft 61A is supported by a corresponding one of first shaft holes 60C formed on a respective one of the side walls 60A of the drum supporting frame 60. The first shaft hole 60C has a circular shape. Each of the photosensitive drums 61 is configured to move vertically relative to the drum supporting frame 60 by the pivotal movements of the respective drum frame 64.

Figure 7:
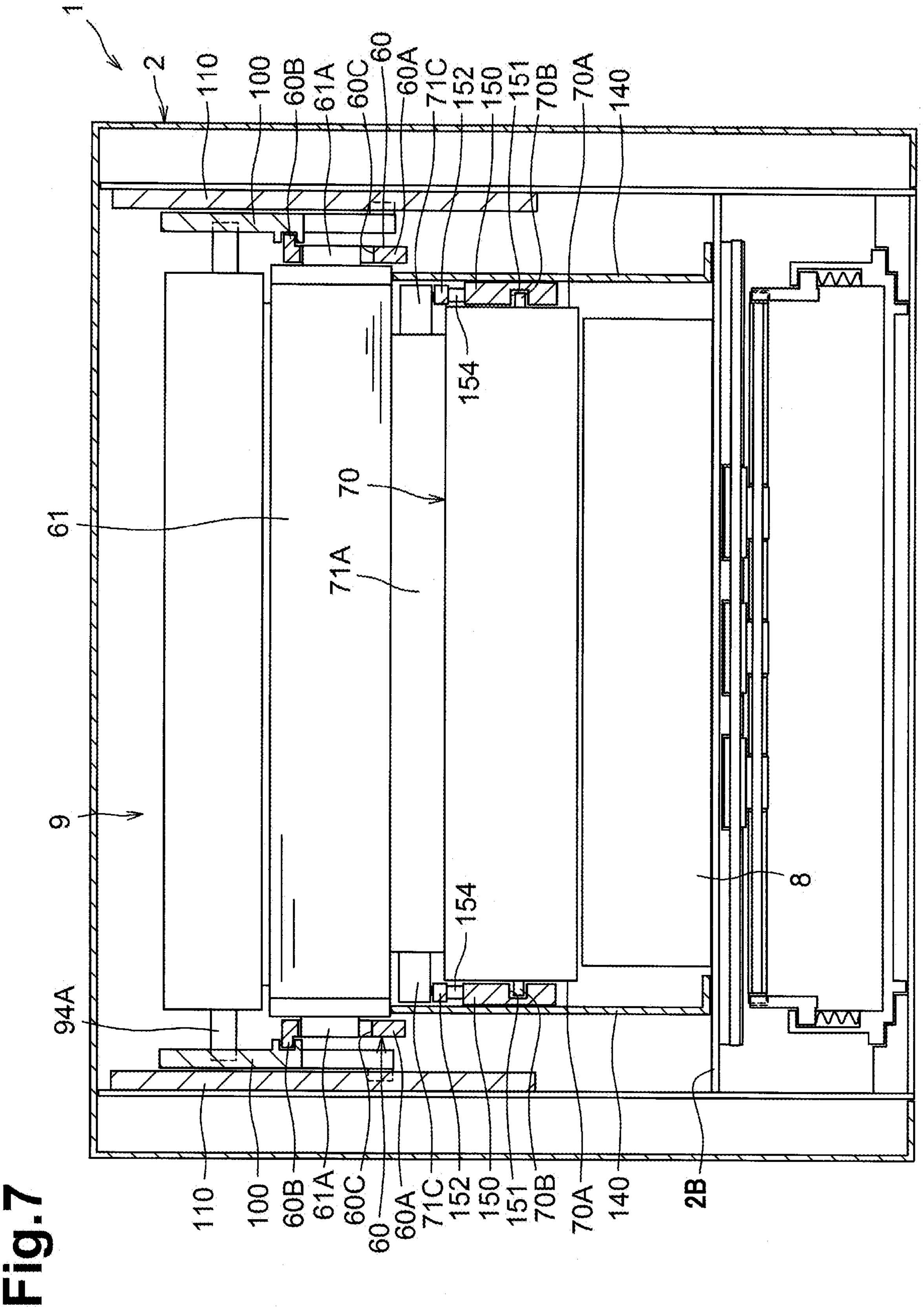
FIG. 7 is a sectional view of the color multifunction device taken along a plane perpendicular to a front-rear direction.

As depicted in FIGS. 2 and 7, a positioning member 140 for positioning the photosensitive drums 61 is disposed inwardly of a respective one of the left and right side walls 60A of the drum supporting frame 60, e.g., closer to the center of the main casing 2 than the respective left and right side wall 60A in the right-left direction. The positioning member 140 has a plate shape. Each of the positioning members 140 is fixed at a lower wall 2B where the scanner unit 8 is disposed in the main casing 2.

The positioning members 140 are disposed at positions corresponding to the right and left ends of the photosensitive drums 61. Each of the positioning members 140 includes recesses 141 disposed at positions corresponding to the respective photosensitive drums 61. Each of the recesses 141 is depressed downward.

As depicted in FIG. 4, a second shaft hole 60D that supports a shaft 63A of the first cleaning roller 63 is provided at a respective one of the side walls 60A of the drum supporting frame 60. The second shaft hole 60D is formed into an elongated hole elongated in the vertical direction. Thus, the first cleaning roller 63 is configured to move vertically relative to the drum supporting frame 60. As will be described in detail, the first cleaning roller 63 is configured to be moved upward to an upper end portion of the second shaft hole 60D (e.g., as the shaft 63A is depicted in a solid line in FIG. 4), when the second cleaning roller 72A contacts the first cleaning roller 63 and to move downward (e.g., as the shaft 63A is depicted in a two-dot chain line in FIG. 4) when the second cleaning roller 72A does not contact the first cleaning roller 63.

Structure of Developing Device Unit

Figure 8A:
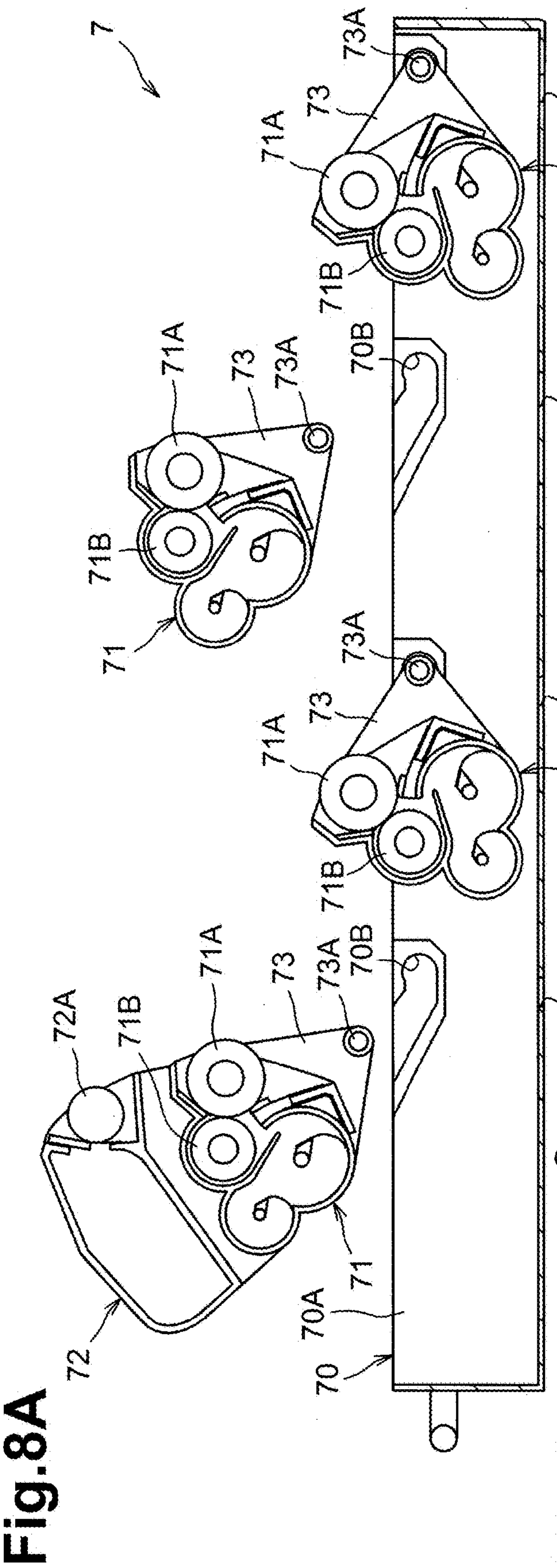
FIG. 8A is a sectional view of a developing device supporting frame.

As depicted in FIG. 8A, the developing device unit 7 includes a developing device supporting frame 70, developing devices 71, a toner storage portion 72, and developing device guide members 150 (refer to FIG. 2).

The developing device supporting frame 70 has a generally box shape with an upper portion thereof being open. The lower wall of the developing device supporting frame 70 has a plurality of openings 70D through which the laser beams emitted from the scanner unit 8 pass.

The developing device supporting frame 70 has recess-shaped guide grooves 70B for supporting the developing devices 71. Each of the guide grooves 70B is disposed at an inner surface of a respective one of left and right side walls 70A. The guide groove 70B extends from the upper end of the respective side wall 70A diagonally rearward and downward and then rearward.

Figure 8B:
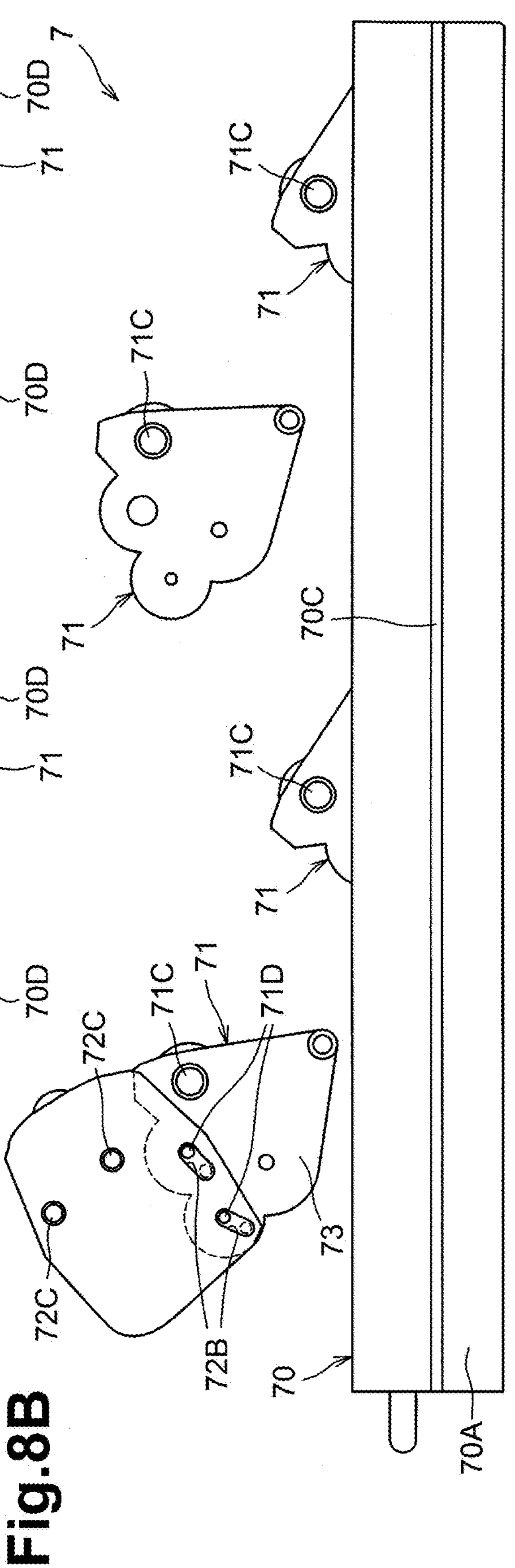
FIG. 8B is side view of the developing device unit.

As depicted in FIG. 8B, the developing device supporting frame 70 includes a developing device rib 70C disposed at an outer surface of a respective one of the side walls 70A. The developing device rib 70C protrudes outward (e.g., toward an exterior of the main casing 2) in the left-right direction and extends in the front-rear direction.

As depicted in FIG. 8A, the developing device 71 includes a developing device frame 73 provided with, for example, the developing roller 71A. A pivot shaft 73A is disposed to the rear of the developing roller 71A of the developing device frame 73. Each of the developing devices 71 is mounted to the developing device supporting frame 70 (e.g., positioned in a respective mounted position) by inserting the respective pivot shaft 73A into a rearmost portion of the corresponding guide groove 70B. In the mounted position, the developing device 71 is configured to pivot about the corresponding pivot shaft 73A.

A shaft 71C of each of the developing rollers 71A protrudes through the corresponding developing device frame 73 outward (e.g., toward an exterior of the main casing 2) in the left-right direction. More specifically, as depicted in FIG. 7, the shaft 71C of the developing roller 71A protrudes outward in the left-right direction such that each of left and right end portions of the shaft 71C protrudes to the left and right, respectively, relative to a respective one of the left and right side walls 70A of the developing device supporting frame 70.

As depicted in FIG. 8B, the toner storage portion 72 has two elongated holes 72B, at lower rear end portions of a side surface of the toner storage portion 72. The toner storage portion 72 is movably supported by the developing device 71 with each of the elongated holes 72B engaging a respective one of protrusions 71D formed at lower front portions of the frontmost developing device frame 73.

Two shaft members 72C protruding outward (e.g., toward an exterior of the main casing 2) in the left-right direction are provided at a side surface of the toner storage portion 72. Each of the shaft members 72C is provided such that each end portion of the shaft member 72C in the left-right direction extends to a position corresponding to a respective end portion of the shaft 71C of the developing roller 71A in the left-right direction.

As depicted in FIG. 7, the developing device guide members 150 are supported by the respective positioning members 140 from an outside of the developing device guide members 150 in the left-right direction, e.g., from a side of the developing device guide member 150 closer to an exterior of the main casing 2 in the left-right direction. Each of the developing device guide members 150 extends in the front-rear direction. As depicted in FIG. 2, each of the developing device guide member 150 includes a developing device guide portion 151 that supports the developing device unit 7.

Figure 9:
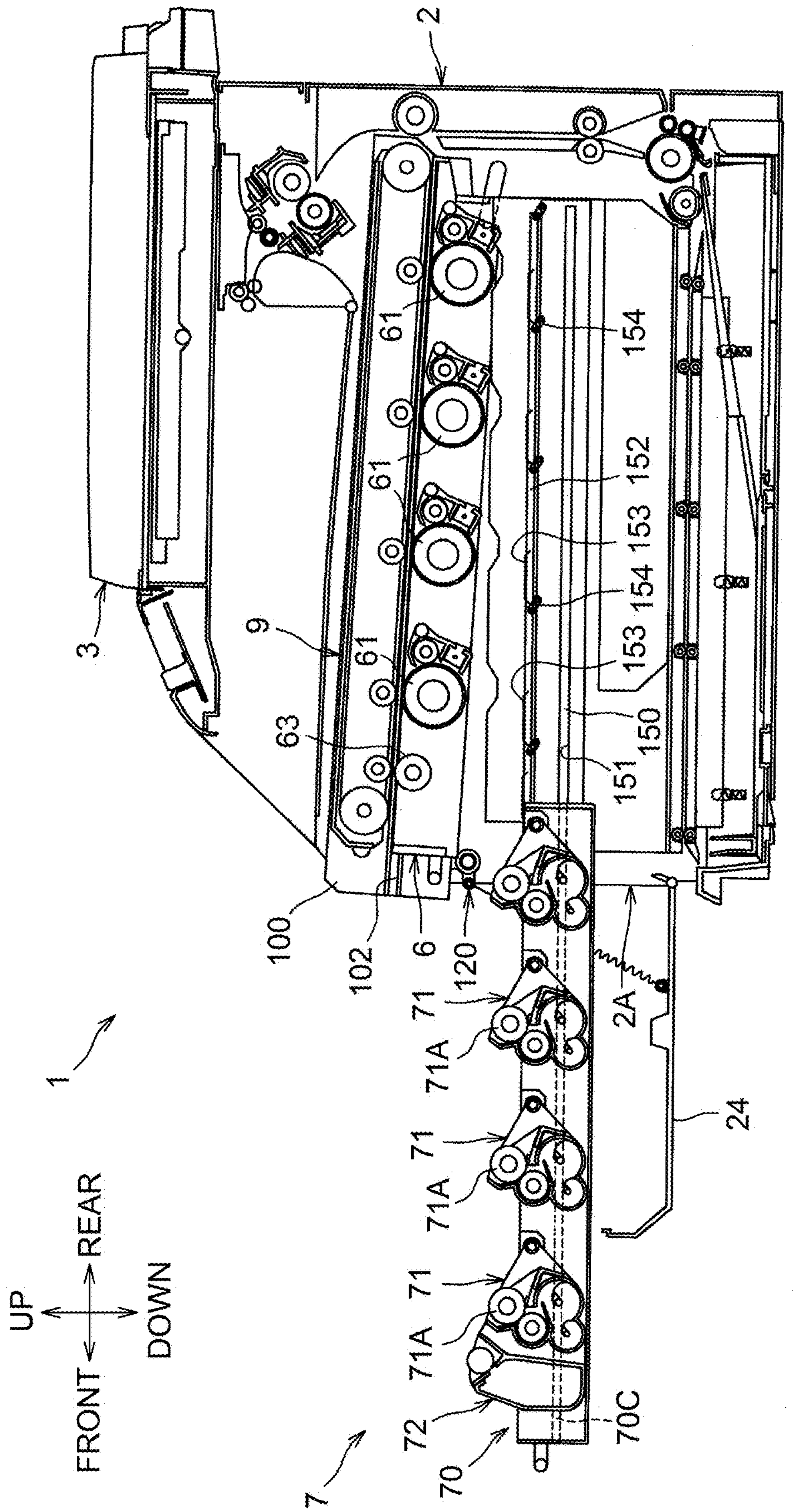
FIG. 9 is a sectional view of the color multifunction device from which the developing device unit is withdrawn.

The developing device guide portions 151 has a groove extending in the front-rear direction. A front portion of the developing device guide portion 151 is open. As depicted in FIG. 9, the developing device guide portion 151 is formed to allow the corresponding developing device rib 70C to pass therethrough. As the movement of the developing device unit 7 is guided by the developing device guide portions 151, the developing device unit 7 may be withdrawn through the opening 2A in the front-rear direction (e.g., in which the developing rollers 71A are arranged).

Each of the developing device guide members 150 includes a developing roller supporting portion 152 configured to press the developing rollers 71A against the corresponding photosensitive drums 61 when the front cover 24 is closed, spring members 153 and link members 154.

Figure 10A:
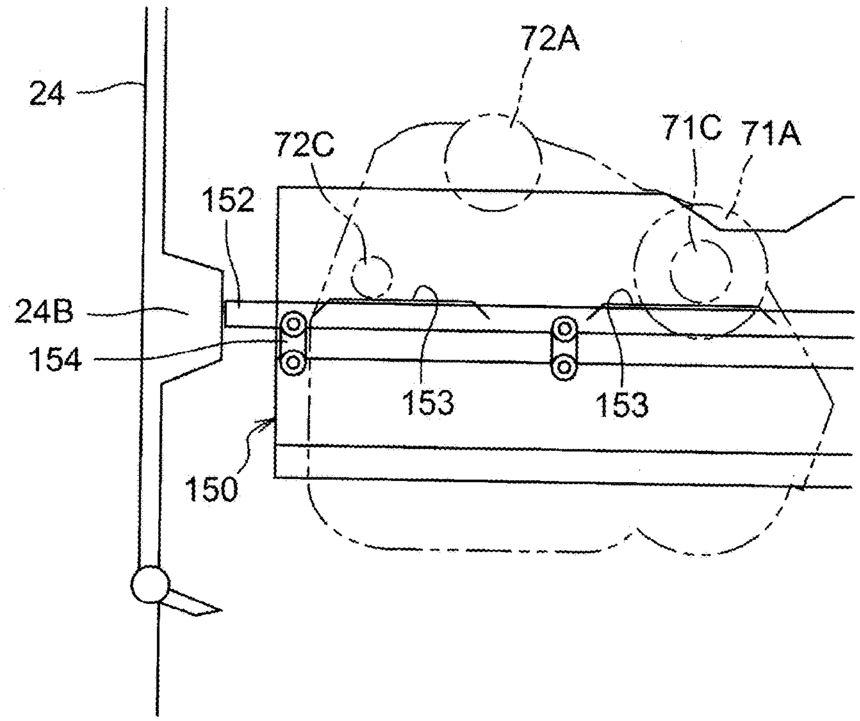
FIG. 10A depicts a relationship between a developing roller supporting portion and the front cover when the front cover is closed.

The developing roller supporting portion 152 extends in the front-rear direction as depicted in FIGS. 2 and 10A. The developing roller supporting portion 152 is positioned below the developing rollers 71A. Each of the developing roller supporting portions 152 is configured such that a tip thereof contacts a respective one of protruding portions 24B protruding from the rear surface of the front cover 24, when the front cover 24 is closed.

The link members 154 link each of the developing device guide members 150 and the respective developing roller supporting portion 152. The link member 154 is disposed in front of five spring members 153 (described below), and behind the rearmost spring member 153, so that the six link members 154 are provided for each developing device guide member 150 and the respective developing roller supporting portion 152. One end (e.g., the lower end) of each of the link members 154 is pivotally coupled to the respective developing device guide members 150. The other end (e.g., the upper end) of each of the link members 154 is pivotally coupled to the respective developing roller supporting portions 152. Each of the developing roller supporting portions 152 is configured to pivotally move relative to the respective developing device guide member 150 as each of the link members 154 pivot about one end thereof.

Each of the spring members 153 protrudes upward from a portion of the developing roller supporting portion 152. A protruding portion of the spring member 153 extends in the front-rear direction. The spring member 153 is disposed in corresponding with a respective one of the four developing rollers 71A and one of the shaft members 72C of the toner storage portion 72, so that the five spring members 153 are provided for each of the developing roller supporting portions 152.

Each of the spring members 153 is configured to contact a respective one of the shafts 71C of the developing rollers 71A and the shaft member 72C of the toner storage portion 72 when the front cover 24 is closed. Each of the spring members 153 is configured to bias a respective one of the developing devices 71 and the toner storage portion 72 upward as each of the spring members 153 contact a respective one of the shafts 71C and the shaft member 72C. Thus, the developing roller supporting portions 152 press the developing rollers 71A toward the corresponding photosensitive drums 61 and press the second cleaning roller 72A toward the first cleaning roller 63.

Figure 10B:
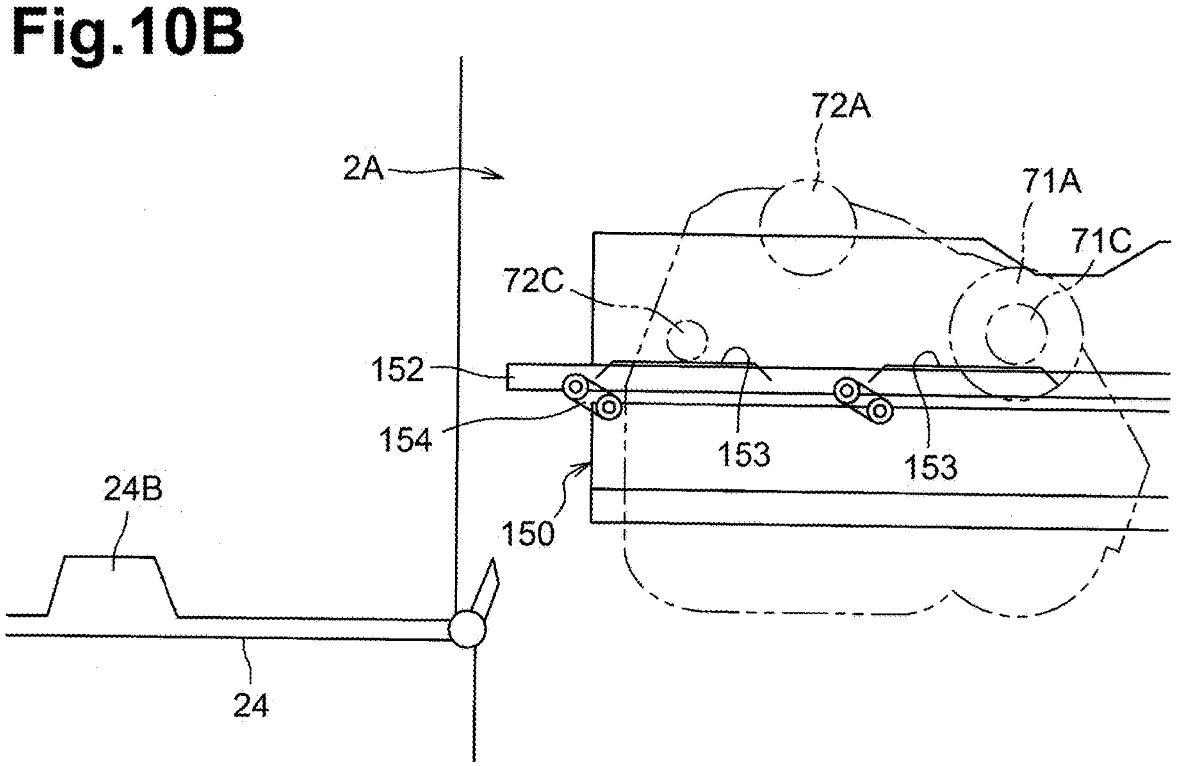
FIG. 10B is depicts a relationship between the developing roller supporting portion and the front cover when the front cover is open.

As depicted in FIG. 10A, when the front cover 24 is closed, a tip of the developing roller supporting portion 152 is in contact with the protruding portion 24B, and each of the link members 154 extends vertically. As depicted in FIG. 10B, when the front cover 24 is open, the tip of the developing roller supporting portion 152 does not contact the protruding portion 24B, and the developing roller supporting portion 152 is moved downward by the weights of the developing devices 71 and downward reaction force of the spring members 153.

Effects of the color multifunction device 1 as structured above will be described. When the front cover 24 is closed as depicted in FIG. 1, the belt unit 9 and the drum unit 6 are disposed at positions to place the photosensitive drums 61 closer to the respective developing rollers 71A. As the front cover 24 is opened as depicted in FIG. 5, the pivotal members 120 pivot, so that an end of each of the first coupling portions 122 is diagonally moved forwardly and upwardly. Accordingly, as a front end portion of each of the movable members 100 is raised while pivoting about the respective shaft portion 103, each of the shaft portions 103 moves from a rear end portion of the respective elongated hole 111 to a position to contact a front end portion of the respective elongated hole 111. In other words, the movable members 100 move, in response to the opening and closing movements of the front cover 24, from an accommodated position (e.g., a position depicted in FIG. 2) to a moved position (e.g., a position depicted in FIG. 3).

As depicted in FIGS. 2 and 3, as the movable members 100 move from the accommodated position to the moved position, the rotation shaft 95A of the follower roller 95 moves from a position where the rotation shaft 95A is in contact with front end portions of the front openings 101A to a position where the rotation shaft 95A contacts rear end portions of the front openings 101A, and the rotation shaft 94A of the drive roller 94 moves from a position where the rotation shaft 94A is in contact with front end portions of the rear openings 101B to a position where the rotation shaft 94A contacts a rear end portions of the rear openings 101B. In other words, the belt unit 9 moves relative to the movable members 100, so that the first transfer rollers 92 are disposed at positions shifted from positions to oppose the corresponding photosensitive drums 61.

At this time, the belt unit 9 diagonally moves forwardly and upwardly together with the movable members 100, and the drive roller 94 moves away from the second transfer roller 93. In other words, the belt unit 9 moves from a first position (e.g., a position depicted in FIG. 2) to a second position (e.g., a position depicted in FIG. 3) higher than the first position, by the movement of the movable members 100 from the accommodated position to the moved position.

As depicted in FIG. 5, as the drum ribs 60B are supported by the corresponding movable members 100, the drum unit 6 moves from a third position (e.g., a position depicted in FIG. 1) where the photosensitive drums 61 are brought closer to the respective developing rollers 71A, to a fourth position (e.g., a position depicted in FIG. 5), which is higher than the third position, and where the photosensitive drums 61 moves away from the respective developing rollers 71A, by the movement of the movable members 100 from the accommodated position to the moved position. In other words, when the front cover 24 moves from the closed position to the open position, the belt unit 9 moves from the first position to the second position and the drum unit 6 moves from the third position to the fourth position. When the front cover 24 moves from the open position to the closed position, the belt unit 9 moves from the second position to the first position and the drum unit 6 moves from fourth position to the third position. Thus, the drum unit 6 is configured to be disposed at a position not to interfere with the developing device unit 7.

As the movable members 100 supporting the belt unit 9 and the drum unit 6 move upward and downward in response to the opening and closing movements of the front cover 24, the belt unit 9 and the drum unit 6 may be readily moved.

As depicted in FIG. 9, the developing device unit 7 is withdrawn through the opening 2A along the developing device guide portions 151 of the developing device guide members 150. Thus, the developing device unit 7 may be readily withdrawn through the opening 2A by just opening the front cover 24 in the illustrative embodiment. Therefore, an operation of withdrawing the developing device unit 7 may be facilitated.

As depicted in FIG. 6, as the front cover 24 is opened, the drum unit 6 may be withdrawn through the opening 2A along the guide portions 102 of the movable members 100. Therefore, both the developing device unit 7 and the drum unit 6 may be withdrawn through the opening 2A by just opening the front cover 24.

Front end portions of the movable members 100 are raised by the first coupling portions 122. An amount of front end portions of the movable members 100 (closer to the opening 2A) moved in the vertical direction (e.g., top-bottom direction) when the movable members 100 move from the accommodated position to the moved position is greater than that of rear end portions of the movable members 100 (e.g., farther from the opening 2A) moved in the vertical direction when the movable members 100 move from the accommodated position to the moved position. In other words, the drum unit 6 is positioned higher toward a front portion thereof, so that the developing device unit 7 may be readily withdrawn. As a movement amount of a rear portion of the movable member 100 in the vertical direction is smaller, interference of the belt unit 9 with a member or component disposed above a rear end portion of the belt unit 9 (e.g., the fixing unit 10) may be prevented or reduced.

When the drum unit 6 is in the third position, the photosensitive drums 61 are disposed at the respective the recesses 141 of the positioning members 140, and the photosensitive drums 61 are raised (e.g., as the shafts 61A are depicted in FIG. 4 by solid lines). When the drum unit 6 is in the fourth position, the photosensitive drums 61 move away from the positioning members 140 and move downward (e.g., as the shafts 61A are depicted in FIG. 4 by two-dot chain lines). The shafts 61A contact the lower edges of the respective first shaft holes 60C.

In other words, the photosensitive drums 61 move down relative to the drum supporting frame 60, when the drum supporting frames 60 are raised. When the drum unit 6 is in the fourth position to withdraw the drum unit 6, interference of the photosensitive drums 61 with the belt unit 9 may be prevented or reduced. When the drum unit 6 is withdrawn, interference of the photosensitive drums 61 with the belt unit 9 may further be prevented or reduced as the first transfer rollers 92 are shifted from positions to oppose the respective photosensitive drums 61.

As depicted in FIGS. 10A and 10B, each of the developing roller supporting portions 152 moves upward and downward in response to the opening and closing movements of the front cover 24. Therefore, the developing device unit 7 moves between a developing position (e.g., a position depicted in FIG. 10A) where the developing rollers 71A oppose the respective photosensitive drums 61 when the front cover 24 is closed, and a retracted position (e.g., a position depicted in FIG. 10B) lower than the developing position when the front cover 24 is opened. Therefore, when the developing device unit 7 is withdrawn, interference with the drum unit 6 disposed above the developing device unit 7 may further be prevented or reduced.

When the developing device unit 7 is raised to the developing position, the shaft member 72C of the toner storage portion 72 is raised by the spring members 153 of the developing roller supporting portions 152 (refer to FIG. 10A). In other words, the toner storage portion 72 moves, in response to the movement of the developing device unit 7, between a position in which the second cleaning roller 72A contacts the first cleaning roller 63 (e.g., a position depicted in FIG. 10A) and a position in which the second cleaning roller 72A does not contact the first cleaning roller 63 (e.g., a position depicted in FIG. 10B) and below the position in which the second cleaning roller 72A contacts the first cleaning roller 63.

Therefore, when the developing device unit 7 is withdrawn, interference of the second cleaning roller 72A with the first cleaning roller 63 may be prevented or reduced. When the drum unit 6 is in the fourth position, the first cleaning roller 63 is lowered. Accordingly, interference of the first cleaning roller 63 with the belt unit 9 when the drum unit 6 is withdrawn may be prevented or reduced.

As the pivotal members 120 and the tension springs 130 couple or connect the movable members 100 and the front cover 24, the opening and closing movements of the front cover 24 may be readily linked with the movements of the movable members 100.

The pivot shaft 24A of the front cover 24 is disposed below the developing device unit 7. Therefore, the developing device unit 7 may be withdrawn without interfering the pivot shaft 24A. When the developing device unit 7 is withdrawn, the front cover 24 is positioned below the developing device unit 7. Therefore the front cover 24 might not interfere with the developing device unit 7.

The tension springs 130 pull the second coupling portions 123 of the pivotal members 120 downward when the front cover 24 is opened, so that the first coupling portions 122 of the pivotal members 120 raise the movable members 100. In other words, the pivotal members 120 convert downward force from the front cover 24 via the tension springs 130 into a force to raise the movable members 100. Thus, the movements of the movable members 100 may be readily linked to the opening and closing movements of the front cover 24. The movable members 100 may be raised with downward force which is relatively less force required by a user.

While the disclosure has been described in detail with reference to the specific embodiment thereof, this is merely an example, and various changes, arrangements and modifications may be applied therein without departing from the spirit and scope of the disclosure.

In the above-described illustrative embodiment, the belt unit 9 and the drum unit 6 are configured to move together, via the movable members 100. However, the disclosure is not limited thereto. The belt unit 9 and the drum unit 6 may be configured to independently move in response to the opening and closing movements of the front cover 24.

In the above-described illustrative embodiment, the pivotal member 120 includes the first coupling portion 122 and the second coupling portion 123. However, the disclosure is not limited thereto. Components of a pivotal member may be changed as necessary according to illustrative embodiments.

In the above-described illustrative embodiment, the tension spring 130 is an example of the connection member. However, the disclosure is not limited thereto. An expandable member other than the tension spring 130 may be used.

In the above-described illustrative embodiment, the drum unit 6 is configured to be withdrawn through the opening 2A. However, the disclosure is not limited thereto. The drum unit 6 may be configured so as not to be withdrawn.

In the above-described illustrative embodiment, a movement amount of a front end portion of the movable member 100 is greater than that of a rear end portion of the movable member 100. However, the disclosure is not limited thereto. For example, movement amounts of the front end portion and the rear end portion of the movable member 100 may be the same.

In the above-described illustrative embodiment, the positioning members 140 are provided to position the photosensitive drums 61. However, the disclosure is not limited thereto. The positioning members 140 may be omitted.

In the above-described illustrative embodiment, the photosensitive drums 61 are configured to move relative to the drum supporting frame 60. The developing devices 71 are configured to move relative to the developing device supporting frame 70. However, the disclosure is not limited thereto. The photosensitive drums 61 and the developing devices 71 may be configured so as not to move.

In the above-described illustrative embodiment, the toner storage portion 72 is provided in the developing device 71. However, the disclosure is not limited thereto. The toner storage portion 72 may be omitted or a toner storage portion may be provided in a belt unit.

In the above-described illustrative embodiment, the color multifunction device 1 is an example of the image forming apparatus. However, the disclosure is not limited thereto. The disclosure may be applied to a printer that does not include, for example, a copying device or the flatbed scanner 3. In the image forming apparatus of the disclosure, photosensitive drums may be exposed with light from, for example, light-emitting diode (LED), electroluminescence (EL) element, and florescent materials, other than laser beams.

In the above-described illustrative embodiment, the interlock mechanism is provided to couple the movable members 100 to the front cover 24 mechanically. However, the disclosure is not limited thereto. The interlock mechanism may include electrical elements, such as a sensor, a processor and a motor, such that the movable members 100 is moved in response to a movement of the front cover 24.

What is claimed is:

1. An image forming apparatus comprising:

a main casing having an opening;

an opening-closing member configured to move between an open position for opening the opening and a closed position for closing the opening;

a plurality of developing devices detachably attached to the main casing through the opening, each of the plurality of developing devices including a developing roller, the developing roller rotating around a shaft extending a first direction, the plurality of developing devices being arranged in a second direction perpendicular to the first direction;

a plurality of photosensitive drums, respective developing devices forming toner images on respective photosensitive drums;

an intermediate transfer belt configured to transfer the toner images formed on respective photosensitive drums to a sheet;

a developing device supporting structure configured to support the plurality of developing devices and configured to move through the opening in the second direction between an inner position inside the main casing and an outer position outside the main casing such that the plurality of developing devices is attachable to and detachable from the developing device supporting structure in the outer position; and a developing device moving mechanism extending in the second direction, a plurality of spring members configured to press the plurality of developing devices being arranged in the second direction, the developing device moving mechanism being configured to move between a first position and a second position with respect to the main casing and configured such that the developing device moving mechanism in the first position presses the plurality of developing devices toward the intermediate transfer belt via the plurality of spring members, wherein in response to a movement of the opening-closing member from the closed position to the open position, the developing device moving mechanism moves from the first position to the second position which is located downstream in a direction in which the developing device supporting structure moves from the inner position to the outer position and is away from the intermediate transfer belt, in response to a movement of the opening-closing member from the open position to the closed position, the developing device moving mechanism moves to the first position and presses the plurality of developing devices toward the intermediate transfer belt via the plurality of spring members, in response to a movement of the opening-closing member from the closed position to the open position, the developing device moving mechanism moves to the second position and releases the pressure of the plurality of developing devices toward the intermediate transfer belt via the plurality of spring members, the developing device moving mechanism in the second position does not contact the opening-closing member, and the developing device moving mechanism in the first position contacts the opening-closing member.

2. The image forming apparatus according to claim 1, wherein the intermediate transfer belt is positioned above the plurality of photosensitive drums.

3. The image forming apparatus according to claim 1, wherein the plurality of developing devices is configured to be pressed in response to a pressing force of the developing device moving mechanism which moves in conjunction with the opening-closing member.

4. The image forming apparatus according to claim 1, wherein the developing device moving mechanism forms a pair, each of which is disposed in the first direction.

5. The image forming apparatus according to claim 1, wherein the developing device moving mechanism includes the plurality of spring members.

6. The image forming apparatus according to claim 1, wherein the plurality of developing devices are interlocked with the opening-closing member such that the developing roller of each of the plurality of developing devices is separated from the respective photosensitive drum when the opening-closing member is in the open position, and the developing roller of each of the plurality of developing devices is close to the respective photosensitive drum and developable when the opening-closing member is in the closed position.

7. The image forming apparatus according to claim 1, further comprising a drum frame detachably attached to the main casing through the opening and including a photosensitive drum.

8. The image forming apparatus according to claim 1, wherein the developing device moving mechanism is positioned below the developing roller and is configured to move with respect to the main casing and configured to press the developing roller upwardly against the photosensitive drum.

9. The image forming apparatus according to claim 1, wherein the developing device moving mechanism is configured to move horizontally.

10. The image forming apparatus according to claim 1, wherein the developing device moving mechanism is configured to move upward and downward.

11. The image forming apparatus according to claim 1, wherein the developing device moving mechanism in the first position is configured such that the plurality of spring members contact a certain portion of the plurality of developing devices to press the plurality of developing devices toward the intermediate transfer belt.

12. The image forming apparatus according to claim 1, wherein the opening-closing member includes a protrusion extending in the second direction, wherein the protrusion contacts an end of the developing device moving mechanism when the opening-closing member is the closed position to hold the developing device moving mechanism in the first position.

13. The image forming apparatus according to claim 12, wherein the plurality of spring members are each pivotally coupled to a respective one of a plurality of link members, and wherein when the protrusion of the opening-closing member contacts the end of the developing device moving mechanism, the plurality of link members extend in a vertical position.

14. The image forming apparatus according to claim 13, wherein the protrusion of the opening-closing member separates from the end of the developing device moving mechanism when the opening-closing member is the open position.

15. The image forming apparatus according to claim 14, wherein when the protrusion of the opening-closing member is separated from the end of the developing device moving mechanism, the plurality of link members extend in the second position.

* * * * *